S. WHITEHALL.
JOINT FOR CLEATS.
APPLICATION FILED DEC. 30, 1908.

935,871.

Patented Oct. 5, 1909.
2 SHEETS—SHEET 1.

Witnesses:
George Oltsch
E R St John

Samuel Whitehall
Inventor
By
Atty.

S. WHITEHALL.
JOINT FOR CLEATS.
APPLICATION FILED DEC. 30, 1908.

935,871.

Patented Oct. 5, 1909.
2 SHEETS—SHEET 2.

Witnesses:
George Oltsch
E. R. St John

Samuel Whitehall
Inventor
By
Attny.

UNITED STATES PATENT OFFICE.

SAMUEL WHITEHALL, OF SOUTH BEND, INDIANA.

JOINT FOR CLEATS.

935,871. Specification of Letters Patent. Patented Oct. 5, 1909.

Application filed December 30, 1908. Serial No. 469,943.

*To all whom it may concern:*

Be it known that I, SAMUEL WHITEHALL, a citizen of the United States, residing at South Bend, in the county of St. Joseph and State of Indiana, have invented certain new and useful Improvements in Joints for Cleats, of which the following is a specification.

This invention relates to a joint for cleats or the like.

One object of the invention is to provide a joint particularly for box cleats embodying such characteristics that one cleat cannot shift longitudinally with relation to the other cleat, and can shift laterally in one direction only, in direct contradistinction to such joints which permit of a shifting of one cleat in either direction laterally.

Another object of the invention resides in the provision of a joint of the nature stated wherein each cleat has its abutting end formed exactly like the end of the adjacent abutting cleat and so formed that splitting of the cleats at their abutting ends is obviated.

With the above and other objects in view, the present invention consists in the combination and arrangements of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

Figure 1:
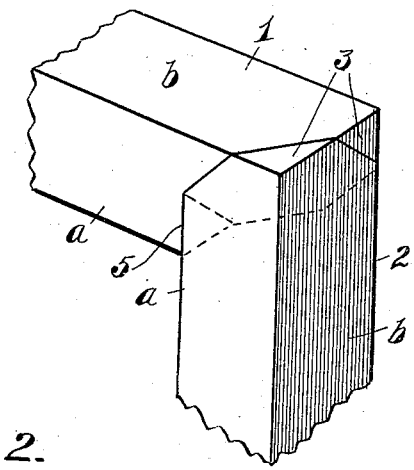
Figure 2:
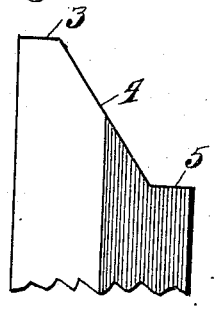
Figure 3:
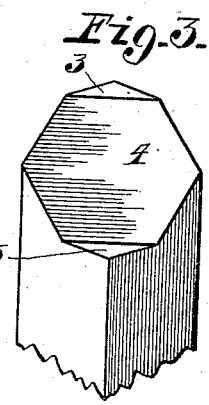
Figure 4:
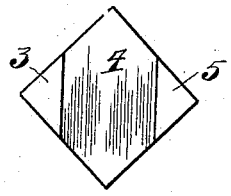
Figure 5:
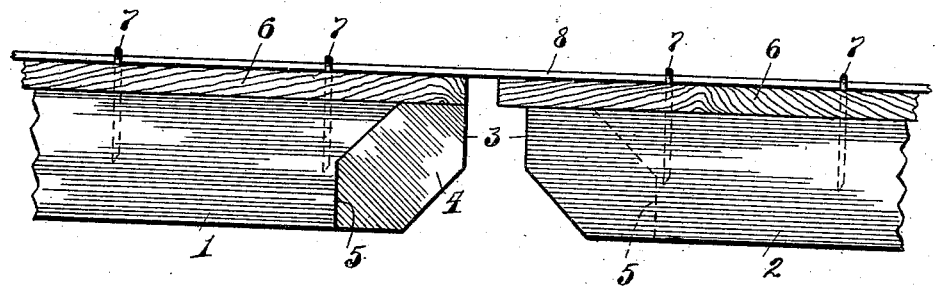
Figure 6:
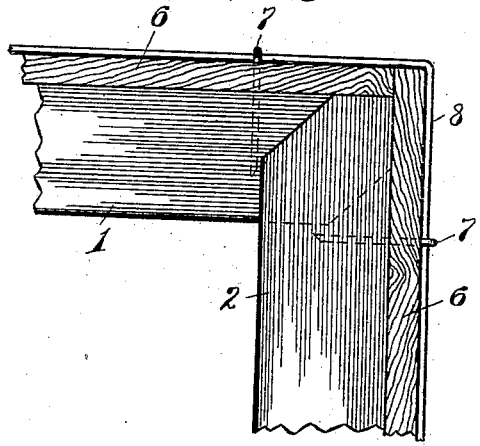

In the drawings:—Figure 1 is a perspective view illustrating two abutting cleats. Fig. 2 is a side view of a portion of one cleat. Fig. 3 is a perspective view looking down at the end of cleat from an angle. Fig. 4 is a top plan view of one of the mitered cleats. Fig. 5 is a view illustrating a portion of a box formed in accordance with the joint of the present invention before being folded. Fig. 6 is a view illustrating a portion of a box folded to form the joint between the ends of two cleats.

Referring now more particularly to the accompanying drawings, the reference characters 1 and 2 indicate cleats disposed at a right angle to each other and in abutting relation in accordance with the present invention.

The abutting ends of each cleat are the same, and therefore but one cleat will be described. Each cleat is preferably rectangular in cross section and is mitered across diagonally opposite edges to provide a reduced end 3, and an inclined face 4 and a shoulder 5.

In practice, the inclined faces 4 of corresponding cleats overlap each other with the reduced end 3 and the shoulder 5 of one cleat lying adjacent opposite edges of the inclined portion of the other cleat, and whereby the shoulder 5 of one cleat will overlap the inner side $a$ of the other cleat to insure a direct right angled disposition of the inner faces $a$—$a$ of the cleats 1 and 2 and to positively prevent longitudinal movement of either cleat and lateral movement inwardly of either cleat with respect to the other.

It will be seen that by reason of the shoulders engaging the inner side faces $a$ of the members outside of their inclined portions 4, that there is a true right angled connection between the inner faces $a$ of the members throughout the entire width of the latter. The same principle follows with regard to the two right angled dispositions of the outer faces $b$ of the members incident to the reduced end portions 3 being disposed adjacent each other, as clearly shown in Fig. 1.

As shown in Figs. 5 and 6 the sheets or sides of the box are stapled to the cleats, the staples 7 straddling the reinforcing wires 8, which are placed coincident with the cleats and which form a hinge for the sides, and as they are folded, bring the cleat ends into coöperative engagement with each other. When the cleats are thus supported by the sides, the cleats of the joint cannot slip longitudinally with relation to each other and may shift laterally in only one direction, as will now be clearly understood.

What is claimed is:—

1. A joint for boxes or the like comprising two members, each member having its abutting ends mitered to provide an inclined face and also a reduced end portion and a shoulder, the shoulder being diagonally opposite the reduced end portion and the latter and the shoulder of one member lying adjacent opposite edges of the inclined face of the other member.

2. A joint for boxes or the like comprising two members, each member having its abutting end mitered to provide an inclined face and also a reduced end portion and a shoulder, the reduced end portion and the shoulder of one member lying adjacent opposite edges of the inclined face of the other member.

3. A joint for boxes or the like comprising two members, each member having its abutting end formed to provide an inclined face and also a shoulder, said shoulders being disposed at a direct right angle to each other and overlapping one side edge of the other member.

4. A joint for boxes or the like comprising two members, each member having its abutting end formed to provide an inclined face and also a shoulder, the operating face of each shoulder bearing upon the inner side face of the other member outside of said inclined face.

5. A joint for boxes or the like comprising two members, each member having its abutting end formed to provide an inclined face and also a shoulder, said shoulders being disposed at a direct right angle to each other and overlapping one side edge of the other member outside of the inclined face of the other member.

6. A joint for boxes or the like comprising two members each having its abutting end provided with an inclined face, also a reduced end portion and a shoulder, the inclined faces of the abutting members overlapping and the reduced end portions coöperating to provide right angled outer faces to the joint equal to the width of the members, and the shoulders coöperating to provide a right angled joint at the inner faces of said members throughout the greatest width of the latter.

In testimony whereof I affix my signature, in presence of two witnesses.

SAMUEL WHITEHALL.

Witnesses:
GEORGE OLTSCH,
LULU D. WAHLEN.